Oct. 22, 1968  MASUO ICHIMORI ET AL  3,406,941

AUTOMATIC WATER-SUPPLY CONTROL SYSTEM

Filed Oct. 27, 1965

INVENTORS
MASUO ICHIMORI
MOTOHIRO KITA
TADAYUKI ISIKAWA
BY
*Orland M. Christensen*
ATTORNEY

United States Patent Office 3,406,941
Patented Oct. 22, 1968

3,406,941
AUTOMATIC WATER-SUPPLY CONTROL SYSTEM
Masuo Ichimori, 15-18 Higashitanakase, Terado, Mukomachi, Otokuni-gun; Motohiro Kita, 29 Shimokaiinji Tojo, Nagaoka-cho, Otokuni-gun; and Tadayuki Isikawa, 37 Kaiden Tenjinyama, Nagaoka-cho, Otokunigun, all of Kyoto, Japan
Filed Oct. 27, 1965, Ser. No. 505,356
Claims priority, application Japan, Oct. 29, 1964,
39/61,418
6 Claims. (Cl. 251—129)

ABSTRACT OF THE DISCLOSURE

This application discloses an automatic water-supply control system for automatically initiating water flow from a faucet or the like upon detection of an object such as a human body or portion thereof near the faucet and stopping the water flow upon removal of the object from near the faucet.

There is known an automatic water-supply system of such a type that when an object such as a human body or portion thereof comes into a predetermined field near a faucet, the approach of the object is detected as a change in the electrostatic capacity of a detecting electrode near the faucet, and the change is utilized to cause the oscillating condition and, consequently, the oscillating output of an oscillator to be changed so that an electromagnetic valve is operated by the output change to open or close a water-supply line. In order to detect the approach of an object as a change in the electrostatic capacity, the detecting electrode must be placed near the outlet of the water-supply line. Thus, when a person's hands approach the water outlet or faucet, the electromagnetic valve is operated to cause water to flow out of the faucet. However, since there comes to exist in the vicinity of the detecting electrode the water flowing out of the faucet, the electrostatic capacity, which was increased upon entrance of the hands into the field of the electrode, is further increased by the presence of the flowing water in the electrode field. Consequently, although removal of the hands from the electrode field causes a decrease in the electrostatic capacity, the decrease may not be sufficient to change the oscillating condition of the oscillator to such an extent as to be able to stop the water flow because the water flowing out of the faucet still exists in the electrode field. If the system is so preset that in order to obtain a high sensitivity of the detector, the oscillating condition of the oscillator is changed by a slight increase in the electrostatic capacity caused by the entrance of an object into the electrode field so as to open the water supply line, removal of the object out of the field will not stop the water flow. On the contrary, if the system is so prearranged that with water flowing out of the faucet due to the presence of an object in the electrode field near the faucet, removal of the object from the electrode field causes stoppage of the water flow without fail, reentrance of the object into the field will not cause water to flow again.

Accordingly, it is one object of the invention to provide an automatic water-supply control system which never fails to stop water flow from an outlet upon removal of an object such as a human hand from near the outlet, yet maintaining a high sensitivity to the approach of an object to the outlet.

Another object of the invention is to provide an automatic water-supply system which is capable of having a first sensitivity before an object enters the field of the detector and a second sensitivity after the object entered the field, the first sensitivity being sufficient to detect the entrance of an object into the field, and initiate flowing of water and the second sensitivity being sufficient to detect removal of the object from the field and stop the water flow without fail.

Another object of the invention is to provide an automatic water-supply system empolying an oscillating circuit as a detector, in which a condenser is connected in parallel with the capacitance of a detecting electrode so that disconnection of the condenser from the capacitance a period of time after the start of water flow will cause the oscillating circuit to be of a different oscillating condition from that which it was before the disconnection.

The invention, its above and other objects, features and advantages will be more apparent from the following detailed description of preferred embodiments thereof with reference to the accompanying drawings, wherein.

Figure 1:
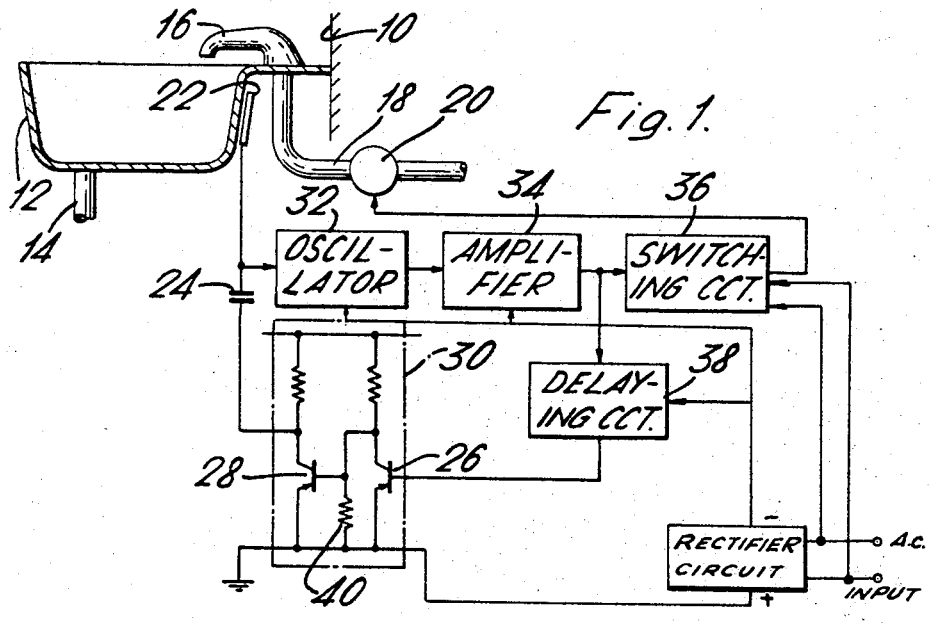
FIG. 1 is a schematic view, partly in block diagram, of one embodiment of the invention.

Referring first to FIG. 1, there is shown a basin 12 made of ceramic material and supported on a wall 10 of a room. The basin is provided at the bottom thereof with a drain pipe 14, and a faucet 16 having no cock is mounted over the basin. The faucet 16 is connected to a supply conduit 18 coming from a source of water, not shown, and having an electromagnetic valve 20 inserted therein. When energized, the valve opens the conduit and closes the same when deenergized. At the back of the basin 12 and adjacent the faucet 16, there is disposed a proximity detecting electrode 22. It will be easily understood that upon entrance of an object, say, a person's hands into the field of the electrode the capacitance of the electrode increases. A condenser 24 is connected in parallel with the capacitance of the electrode. A switching circuit 30 is shown comprising a pair of transistors 26 and 28, the on-off condition of each of which is opposite to that of the other. The condenser 24 is connected in series with the transistor 28, so that if the transistor 28 is on, the parallel connection of the two capacitances is maintained, while when the transistor is off, the connection is broken.

The capacitances of the electrode 22 and the condenser 24 are utilized as elements to vary the oscillating condition of an oscillator 32. That is, these elements are used as part or all of a capacitance comprising an element of a tuned circuit in the oscillator 32.

The oscillating output of the oscillator 32 is amplified by an amplifier 34, the output of which is in turn applied to a switching circuit 36, such as an alternating-current contactless relay of a transistorized type. While the amplified output is being applied to the relay 36, it is in the off-condition, so that the electromagnetic valve 20 is closed. When the oscillating output of the oscillator 32 has stopped, no signal is applied to the relay 36 so that it become "on" and the valve 20 is energized to open the conduit 18 to cause water to flow out of the faucet 16.

The output of the amplifier 34 is also applied to a delaying circuit 38. The circuit 38 is so arranged that while the output of the amplifier 34 is being applied to the circuit 38, it does not produce any output, but that when the output of the amplifier stops, the circuit 38 produces an output after a predetermined period of time. The output of this circuit 38 is applied to the base of the transistor 26. The arrangement is such that so long as the oscillator 32 maintains its oscillations, the transistor 26 is "off" and the other transistor 28 is "on." Then, the signal from the delaying circuit 38 applied to the base of the transistor 26 turns it on, whereupon a current flows through a biasing resistor 40 to cause a drop in the voltage thereacross, and this turns the transistor 28 off.

When there is no object near the electrode 22, the electrostatic capacity connected to the oscillator 32 is substantially that of the condenser 24 only. Under the condition, the oscillator is capable of maintaining its oscillations. However, the oscillator is so constructed and arranged that a slight increase in the electrostatic capacity connected to the oscillator 32 causes stoppage of the oscillations. In other words, the oscillator is under the condition of being highly sensitive to approach of an object toward the detecting electrode, that is, having a "first" sensitivity.

When a person's hands approach the faucet 16 and, consequently the electrode 22, the capacitance of the electrode increases so that the oscillator 32 stops its oscillations. Then the relay 36 is turned on to energize the electromagnetic valve 20 to open the water conduit 18 so that water flows out of the faucet 16 into the basin 12. Then, the flowing water causes an additional increase in the capacitance of the electrode 22.

On the other hand, a certain period of time, say, a couple of seconds after the stoppage of the oscillations of the oscillator, that is, when water has started flowing out of the faucet, the time-delaying circuit 38 produces an output, which is applied to the base of the transistor 26 to turn it on, thereby turning off the other transistor 28. This cuts off the condenser 24 from the ground, so that the capacitance now connected to the oscillator 32 comprises that of the electrode 22 caused by the presence adjacent thereto of both the human body and the water flowing out of the faucet 16. Under the condition, the oscillator 32 still remains inoperative, that is, not oscillating, but now is readier to resume its oscillations than it would be if the condenser 24, together with the capacitance of the electrode 22 caused by both the human body and the water flowing out of the faucet, were connected to the oscillator 32. Then the oscillator may be referred to as having a second sensitivity.

Under the condition, when the person removes his hands from near the faucet, a resulting decrease in the capacitance that has been existing causes the oscillator 32 to start its oscillations again, so that the electromagnetic valve 20 is closed to stop the water flow and at the same time the transistor 26 is turned off and the transistor 28 is turned on, through which latter the condenser 24 is again grounded. Thus, the oscillator is restored to its first sensitivity.

To put the above description in more concrete terms, suppose that the oscillator is so designed that its oscillations continue when the capacitance connected to the oscillator is below 4.5 pf., but that the oscillations stop when the capacitance is higher than that value; and the capacitance of the condenser 24, and those of the electrode 22 caused by a human body and the water flowing from the faucet are 4.0, 2.0, 3.0 pf. respectively. With no human body being adjacent the faucet, the capacitance connected to the oscillator is only that of the condenser 24, that is, 4.0 pf., so that the oscillations are maintained. When a person places his hands so near that the capacitance of the electrode 22 reaches 0.5 pf., the oscillator 32 stops its oscillations so that water flows out of the faucet. As the person moves his hands nearer to the faucet until the capacitance increases to about 2.0 pf., the transistor 28 is turned off to cut off the condenser 24 from the ground so that the whole capacitance now becomes 5.0 pf. including the capacitance caused by the flowing water.

Under the condition, since the capacitance value is higher than the value of 4.5 pf., the oscillator 32 remains inoperative, but ready to start its oscillations when the capacitance decreases by only 0.5 pf. Then, upon removal of the hands from near the faucet so far that a decrease of only 0.5 pf. in the capacitance is resulted, the oscillator starts its oscillations again so that the water flow stops.

In the above description the arrangement is such that the oscillator is so arranged and constructed that its oscillations stop upon the approach of an object, but the arrangement may of course be such that the oscillator operates in the opposite manner.

Figure 2:
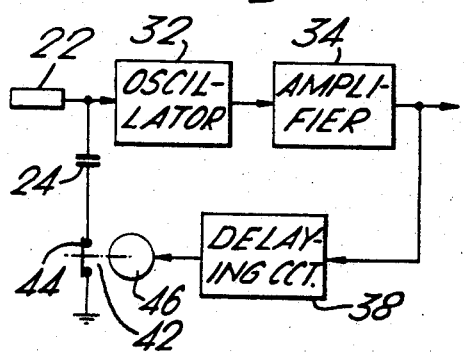
FIG. 2 is a block diagram of a portion of another embodiment of the invention.

In FIG. 2, the transistorized switching circuit 30 is replaced by a contact relay 42. The relay 42 has its contacts 44 connected in series with the condenser 24 and its coil 46 so connected as to be energized by the output of the time delaying circuit 38. When a person's hands approach the electrode 22 to stop the oscillations of the oscillator 32, the output of the delaying circuit 38 produced after a time delay energizes the coil 46 to open the contacts 44, whereby the condenser 24 is cut off from the input side of the oscillator. The operation of the circuit arrangement of FIG. 2 will be so easily understood from that of FIG. 1 that no further description will be necessary.

Figure 3:
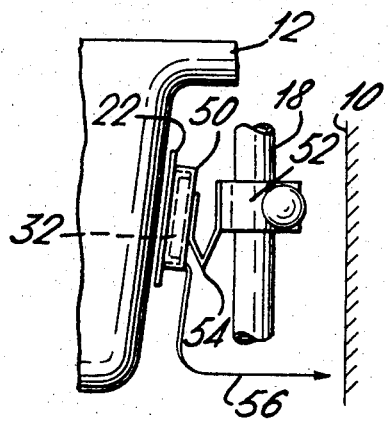
FIG. 3 is a side view showing an example of the mounting means of the detecting electrode with its associated elements.

In practice, the oscillator 32 together with the amplifier 34 and the electromagnetic valve 20 may be enclosed in a single casing, which is connected through a lead line to the detecting electrode. With such an arrangement, however, if the lead line happens to be moved or displaced by one cause or another, the capacitance on the lead line varies, with resulting fluctuations in the sensitivity of the apparatus. The problem can be solved by separating the oscillator 32 from the other circuits and combining it with the detecting electrode 22. An example of the arrangement is shown in FIG. 3, wherein the oscillator 32 which is preferably composed of transistors is enclosed in a casing 50 of a suitable insulating material, to one surface of which is secured the detecting electrode 22. The casing 50 is positioned behind the basin 12, with the electrode 22 facing the basin rear wall, and supported by an arm 54 which is removably and adjustably secured to the water-supply conduit 18. A lead line 56 transmits the output of the oscillator 32 to the amplifier 34 which may be enclosed in a separate casing, not shown, together with the electromagnetic valve 20. In this arrangement, since the lead line connecting the electrode 22 and the oscillator 32 is also enclosed in the casing 50, it is held stationary so that the operating sensitivity of the apparatus can be maintained stable. The switching circuit 30 and the condenser 24 may also be advantageously enclosed in the casing 50.

It should be recognized that the embodiments above described and illustrated are merely representative and that many modifications and changes are possible within the true scope and spirit of the invention as defined in the appended claims.

What we claim is:

1. A liquid supply control system comprising a liquid supply conduit having an outlet, a detecting electrode disposed adjacent said outlet, an electromagnetic valve for opening and closing said liquid supply conduit, opening means for opening said electromagnetic valve in response to the approach of an object to the detecting electrode comprising oscillating means and a condenser connected in parallel, switching means for disconnecting the condenser after liquid begins to flow from the outlet, and closing means comprising said oscillator free from said condenser for closing said electromagnetic valve in response to the removal of said object from the detecting electrode.

2. A control system for an electromagnetic valve comprising a liquid supply conduit having an outlet, a detecting electrode disposed adjacent said outlet, an electromagnetic valve for opening and closing said liquid supply conduit, control means comprising an oscillator for opening said electromagnetic valve in response to the approach of an object to the detecting electrode and closing said electromagnetic valve in response to the removal of said object from the detecting electrode, and means for varying the oscillating condition of said oscillator comprising a condenser connected in parallel with said oscillator and a switching means, said switching means disconnecting said condenser automatically after said oscillator opens said electromagnetic valve in response to the said approach of said object to said detecting electrode and automatically reconnecting said condenser when said oscillator closes said electromagnetic valve in response to said removal of said object from said detecting electrode.

3. A water-supply control system as defined in claim 2, including means for operating said switching means a predetermined period of time after said variation in the oscillating condition of said oscillator.

4. A water-supply control system as defined in claim 2, wherein said switching means comprises a pair of transistors, the on-off condition of each of which is opposite to that of the other, one of said transistors being controlled by the output of said oscillator and being off before water flows out of said outlet, and the other being connected in series with said condenser.

5. A water-supply control system as defined in claim 2, wherein said switching means comprises a relay having its coil energized by the output of said oscillator when it is under an oscillating condition before water flows out of said outlet and deenergized by the output of said oscillator when it is under another oscillating condition after water has flowed out of said outlet, and its contact connected in series with said condenser.

6. A water-supply control system as defined in claim 2, wherein said electrode and said oscillator are enclosed in a single and same casing, which is disposed adjacent to said outlet, with said electrode being maintained near said outlet.

References Cited
UNITED STATES PATENTS

| | | | |
|---|---|---|---|
| 2,922,880 | 1/1960 | Elam | 317—123 |
| 3,081,594 | 3/1963 | Atkins et al. | 317—146 X |
| 3,151,340 | 10/1964 | Teshima | 251—129 X |
| 3,254,313 | 5/1966 | Atkins et al. | 317—123 |
| 3,314,081 | 4/1967 | Atkins et al. | 4—100 |

M. CARY NELSON, *Primary Examiner.*

R. C. MILLER, *Assistant Examiner.*